(12) United States Patent
Akaike et al.

(10) Patent No.: US 10,358,061 B2
(45) Date of Patent: *Jul. 23, 2019

(54) VEHICLE SEAT

(71) Applicant: TOYOTA BOSHOKU KABUSHIKI KAISHA, Aichi-ken (JP)

(72) Inventors: Fumitoshi Akaike, Aichi-ken (JP); Seiya Nishimura, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/165,197

(22) Filed: May 26, 2016

(65) Prior Publication Data

US 2016/0347219 A1     Dec. 1, 2016

(30) Foreign Application Priority Data

May 26, 2015    (JP) .................. 2015-106639

(51) Int. Cl.
     *B60N 2/56*      (2006.01)
(52) U.S. Cl.
     CPC ........... *B60N 2/5628* (2013.01); *B60N 2/565* (2013.01); *B60N 2/5657* (2013.01)
(58) Field of Classification Search
     CPC ..... B60N 2/5628; B60N 2/565; B60N 2/5657
     See application file for complete search history.

(56) References Cited

U.S. PATENT DOCUMENTS

| | | | |
|---|---|---|---|
| 2011/0187165 A1* | 8/2011 | Oota ................... | B60N 2/5671 297/180.14 |
| 2012/0315132 A1 | 12/2012 | Axakov et al. | |
| 2013/0165033 A1* | 6/2013 | Fitzpatrick ......... | B60H 1/00285 454/120 |
| 2015/0091340 A1* | 4/2015 | Hulway ............... | B60N 2/5621 297/180.14 |
| 2016/0009206 A1* | 1/2016 | Perraut ................ | B60N 2/5635 297/180.12 |

(Continued)

FOREIGN PATENT DOCUMENTS

| | | |
|---|---|---|
| JP | 5-213056 | 8/1993 |
| JP | 2010-052494 | 3/2010 |

OTHER PUBLICATIONS

U.S. Appl. No. 15/165,181 to Fumitoshi Akaike et al., which was filed May 26, 2016.

(Continued)

*Primary Examiner* — Timothy J Brindley
(74) *Attorney, Agent, or Firm* — Greenblum & Bernstein, P.L.C.

(57) ABSTRACT

There is provided a vehicle seat including: a seat main body having a major surface facing a user seated; a first air passage extending from an air conditioning device of a vehicle toward the seat main body so as to guide air from the air conditioning device to the seat main body; an outlet communicating with the first air passage and opened toward a first region of the major surface through the seat main body; a second air passage having an inlet which is opened toward a second region of the major surface through the seat main body so as to suck air from the second region; and a blower configured to suck air in the second air passage.

3 Claims, 4 Drawing Sheets

(56) References Cited

U.S. PATENT DOCUMENTS

| | | | |
|---|---|---|---|
| 2016/0250956 A1* | 9/2016 | Seiting | B60N 2/5671 |
| | | | 297/180.14 |
| 2016/0272038 A1* | 9/2016 | Tanaka | B60H 1/00285 |
| 2016/0304013 A1* | 10/2016 | Wolas | B60N 2/5628 |
| 2016/0325655 A1* | 11/2016 | Joshi | B60H 1/00285 |
| 2016/0347218 A1* | 12/2016 | Akaike | B60N 2/5628 |
| 2016/0347219 A1* | 12/2016 | Akaike | B60N 2/5628 |
| 2017/0015226 A1* | 1/2017 | Wolas | B60N 2/5628 |
| 2017/0028886 A1* | 2/2017 | Zhang | B60N 2/565 |
| 2017/0129375 A1* | 5/2017 | Zhang | B60N 2/5621 |
| 2017/0181225 A1* | 6/2017 | Inaba | B60N 2/565 |
| 2017/0225598 A1* | 8/2017 | Noguchi | B60N 2/5642 |

OTHER PUBLICATIONS

Japanese Office Action for JP2015-106639 dated Sep. 25, 2018, along with English translation.

* cited by examiner

VEHICLE SEAT

CROSS-REFERENCE TO RELATED APPLICATIONS

This application claims priority from Japanese Patent Application No. 2015-106639 filed on May 26, 2015, the entire contents of which are incorporated herein by reference.

TECHNICAL FIELD

The present disclosure relates to a vehicle seat mounted on a vehicle such as an automobile, a train and an airplane.

BACKGROUND

JP-A-H05-213056 discloses an air conditioning device for a seat provided in an automobile. The seat has a seat cushion, a seat back coupled to a rear portion of the seat cushion, and a headrest coupled to an upper portion of the seat back. The air conditioning device has an outlet in an upper portion of the headrest and an inlet in a side portion of the seat back and a side portion of the seat cushion. The outlet is configured to blow out cold air or warm air downward from the upper portion of the headrest. The inlet is opened upward in the side portion of the seat cushion or opened laterally in the side portion of the seat back such that there is no hindrance to a user seated on the seat.

By using a blower fan provided at a lower side of the seat, air is sucked from the inlet via an intake duct. The air is cooled or warmed by a cooler or heater provided at the downstream of the blower fan. The cold air or warm air is blown out from the outlet via a discharge duct and is again sucked from the inlet. Therefore, the surroundings of the user seated on the seat can be intensively air-conditioned. Further, a heat exchanger is also provided for performing the heat exchange between the cold air or warm air passing through the discharge duct and the air passing through the intake duct. In this way, the seat can be cooled or heated by using the intake duct.

However, a technique of warming or cooling a user seated on a seat by using a method different from related art or using a smaller energy has been demanded.

SUMMARY

According to an aspect of the present disclosure, there is provided a vehicle seat including: a seat main body having a major surface facing a user seated; a first air passage extending from an air conditioning device of a vehicle toward the seat main body so as to guide air from the air conditioning device to the seat main body; an outlet communicating with the first air passage and opened toward a first region of the major surface through the seat main body; a second air passage having an inlet which is opened toward a second region of the major surface through the seat main body so as to suck air from the second region; and a blower configured to suck air in the second air passage.

DETAILED DESCRIPTION

Figure 1:
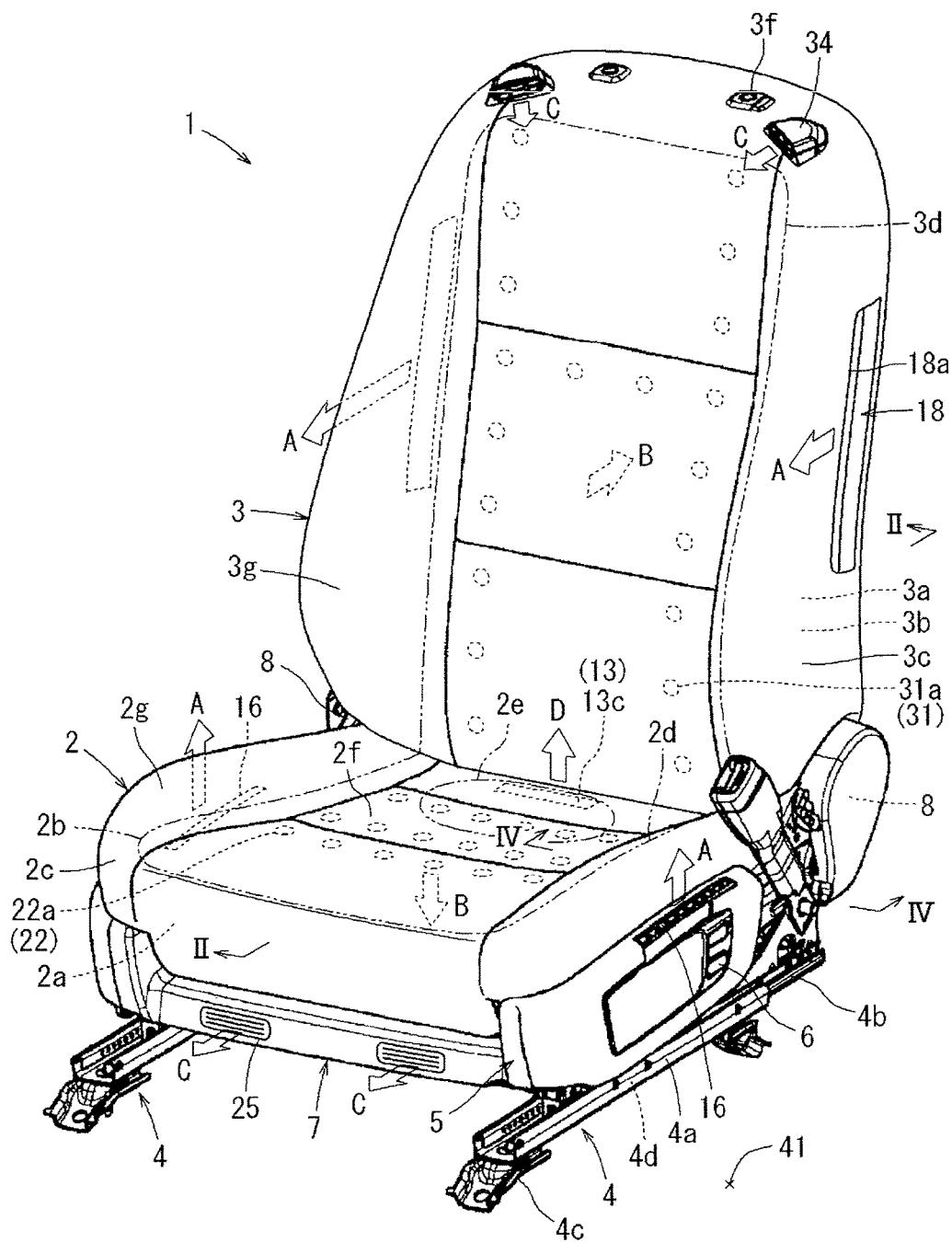
FIG. 1 is a perspective view of a vehicle seat.

An embodiment of the present disclosure will be described with reference to FIGS. 1 to 4. As shown in FIG. 1, a vehicle seat 1 is mounted on a floor 41 of a vehicle such as an automobile, a train, an airplane and a vessel. The vehicle seat 1 has a seat cushion 2 for supporting a hip of a user 40 (see FIG. 4) and a seat back 3 for supporting a back of the user 40.

Figure 2:
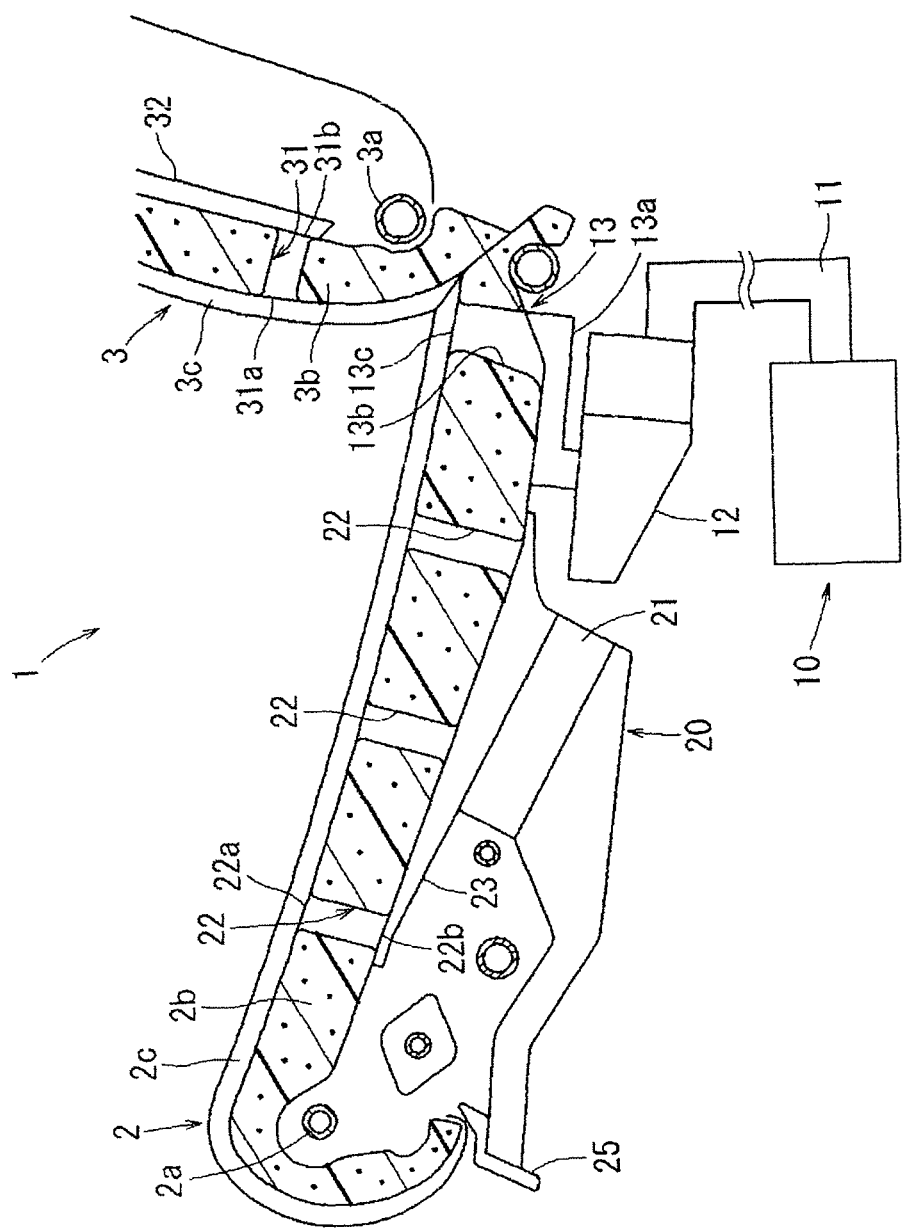
FIG. 2 is a sectional view taken along a line II-II shown in FIG. 1.

As shown in FIGS. 1 and 2, the seat cushion 2 has a frame 2a, a pad 2b mounted on the frame 2a and a seat cover 2c covering the pad 2b. The frame 2a has a rectangular frame main body extending along an outer periphery of the seat cushion 2 and an elastic member suspended from the frame body and elastically supporting the pad 2b. The pad 2b is formed of foam urethane or the like. The seat cover 2c is made of fabric or leather.

As shown in FIGS. 1 and 2, the seat back 3 has a frame 3a, a pad 3b mounted on the frame 3a and a seat cover 3c covering the pad 3b. The frame 3a has a rectangular frame main body extending along an outer periphery of the seat back 3 and an elastic member suspended from the frame body and elastically supporting the pad 3b. A lower portion of the frame 3a is coupled, in an angle adjustable manner, to a rear portion of the frame 2a of the seat cushion 2 by a recliner 8.

As shown in FIG. 1, the seat cushion 2 is longitudinally movably attached to the floor 41 by two slide devices 4. The slide device 4 has a lower rail 4a, an upper rail 4b slidably attached to the lower rail 4a and a bracket 4c attaching the lower rail 4a to the floor 41. The upper rail 4b slides relative to the lower rail 4a by an actuator 4d. The actuator 4d has a motor which is controlled by a switch 6. Therefore, the operation of the switch 6 allows the vehicle seat 1 to move longitudinally relative to the floor 41.

As shown in FIG. 1, the switch 6 is provided to a side shield 5. The side shield 5 is attached to a side portion of the seat cushion 2 and covers a lower region of the side portion of the seat cushion 2. In this way, the design of the vehicle seat 1 is improved. A plurality of switches 6 is provided in the side shield 5. The recliner 8 is controlled by one switch 6, so that an angle of the seat back 3 relative to the seat cushion 2 can be adjusted. A lifter (not shown) is provided in the seat cushion 2. The lifter is controlled by one switch 6, so that a height of the seat cushion 2 can be adjusted.

As shown in FIG. 1, a front shield 7 is provided to the front portion of the seat cushion 2. The front shield 7 is attached to the seat cushion 2 and covers a lower region of the front portion of the seat cushion 2. In this way, the design of the vehicle seat 1 is improved.

Figure 3:
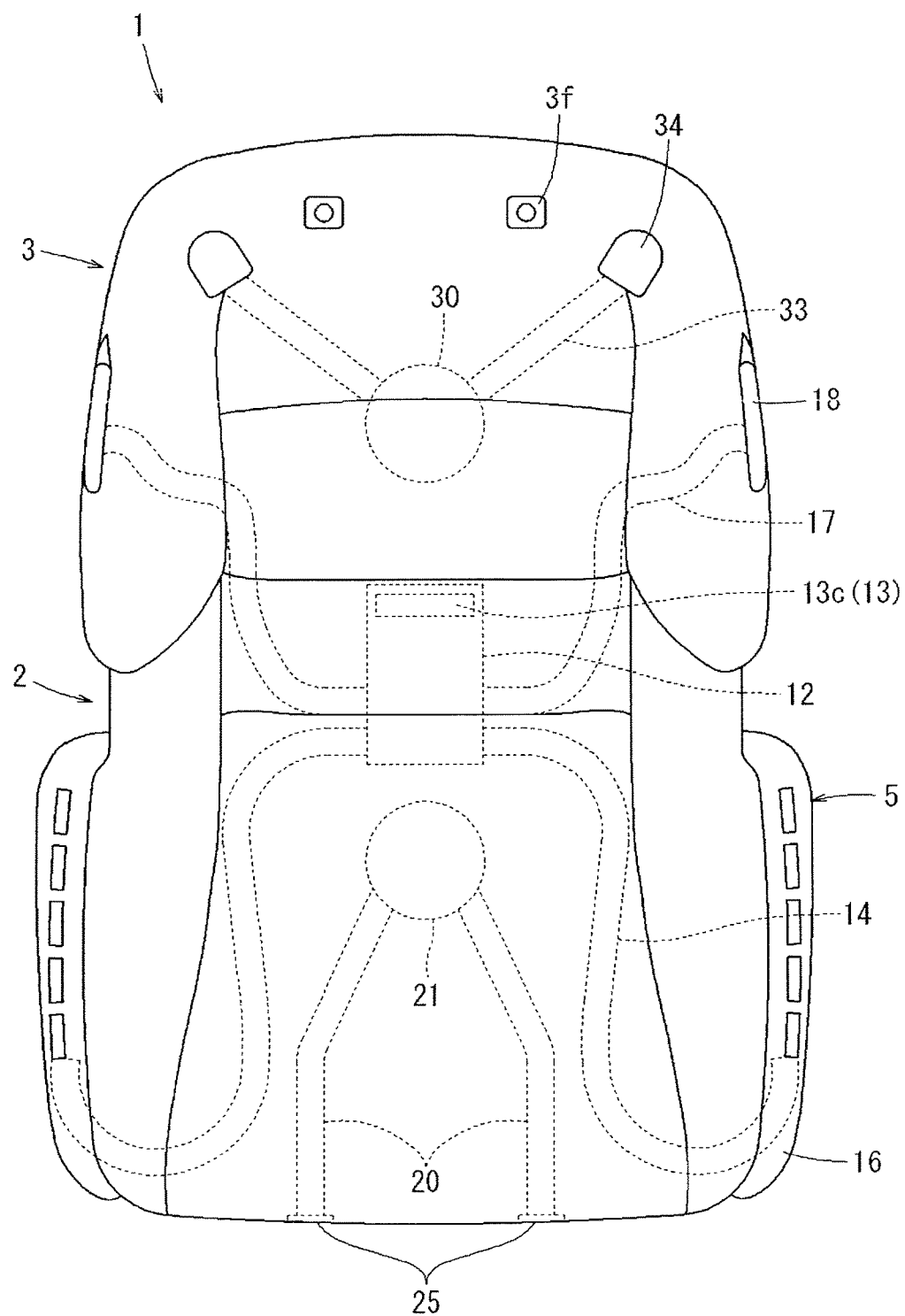
FIG. 3 is a plan view of the vehicle seat.

As shown in FIGS. 1 to 3, a mechanism for warming or cooling the user 40 by using air from an air conditioning device 10 is provided in the seat cushion 2 and the seat back 3. The air conditioning device 10 is provided in a main body of a vehicle, such as an engine room of an automobile. The air conditioning device 10 receives air, cools or warms the air and blows out the air to the interior of the vehicle. A guide duct 11 for guiding the air exhausted from the air conditioning device 10 to the vehicle seat 1 is coupled to the air conditioning device 10. One end of the guide duct 11 is coupled to the air conditioning device 10 and the other end thereof is coupled to a distributor 12 attached to a lower side of the seat cushion 2.

As shown in FIGS. 2 and 3, a discharge duct 13 is coupled to the distributor 12. The discharge duct 13 has a pipe 13a extending from the distributor 12 and a hole 13b formed in the pad 2b. The hole 13b has an outlet 13c facing the seat cover 2c. The outlet 13c is located at a central region of the rear portion of the seat cushion 2. The pad 2b may be provided with one outlet 13c elongated in a left-right direction or may be provided with a plurality of outlets 13c arranged in the left-right direction. The central region of the rear portion of the seat cushion 2 is a first region 2e which receives a relatively high pressure when the user 40 is seated on the seat cushion 2 (see FIG. 1).

Figure 4:
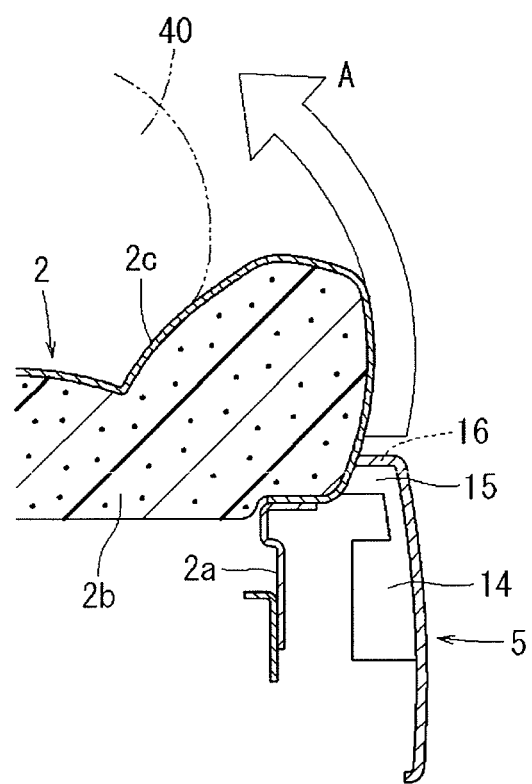
FIG. 4 is a sectional view taken along a line IV-IV shown in FIG. 1.

As shown in FIGS. 3 and 4, a discharge duct 14 is coupled to the distributor 12. The discharge duct 14 extends from the distributor 12 toward the side portion of the seat cushion 2, specifically, toward the front portion of the side shield 5. The discharge duct 14 is coupled to a second duct 15 extending longitudinally along an upper portion of the side shield 5. The second duct 15 is communicating with a plurality of first outlets 16 formed in the upper portion of the side shield 5.

As shown in FIGS. 3 and 4, the first outlets 16 are opened upward. Therefore, the air from the air conditioning device 10 (see FIG. 2) is blown out upward along the side portion of the seat cushion 2 from the first outlets 16 (primary air stream A). The air along the side portion of the seat cushion 2 flows along the side portion and upper surface of the seat cushion 2 or the user 40 by a Coanda effect. In this way, the air from the air conditioning device 10 is blown to the vicinity of the user 40. The first outlets 16 and the side shield 5 are provided at both left and right sides of the seat cushion 2.

As shown in FIG. 3, a discharge duct 17 is coupled to the distributor 12. The discharge duct 17 extends from the distributor 12 toward the side portion of the seat back 3. A first outlet 18 is coupled to an end portion of the discharge duct 17. As shown in FIG. 1, the first outlet 18 is provided in the side portion of the seat back 3. The first outlet 18 has an opening 18a which is vertically elongated along the side portion of the seat back 3 and opened forward. Therefore, the air from the air conditioning device 10 (see FIG. 2) is blown out forward along the side portion of the seat back 3 from the first outlet 18 (primary air stream A). The air flows along the side portion and front surface of the seat back 3 or the user 40 by the Coanda effect. In this way, the air from the air conditioning device 10 is blown to the vicinity of the user 40. The first outlet 18 is provided at both left and right sides of the seat back 3.

As described above, the air from the air conditioning device 10 (see FIG. 2) is blown to the user 40 through the seat cover 2c from the outlet 13c in the rear portion of the seat cushion 2. Furthermore, the air from the air conditioning device 10 is also blown out from the first outlets 16 in the side portion of the seat cushion 2 and the first outlets 18 in the side portion of the seat back 3 (air stream D shown in FIG. 1). Therefore, the air from the air conditioning device 10 is primarily blown out toward the user 40 from the vehicle seat 1.

As shown in FIGS. 1 and 2, a structure for sucking the air blown out is provided in the seat cushion 2 and the seat back 3. A hole 22 penetrating in a thickness direction is formed in the pad 2b of the seat cushion 2. The hole 22 has an inlet 22a facing the seat cover 2c. A plurality of holes 22 is provided in a major surface 2d of the seat cushion 2. The major surface 2d is a region which faces the user 40 when the user 40 is seated on the vehicle seat 1. Specifically, the major surface 2d is a region excluding the left and right regions on the upper surface of the seat cushion 2. The left and right regions are bulged upward from the major surface 2d. Meanwhile, the holes 22 may be provided also in the left and right regions.

As shown in FIG. 1, the major surface 2d receives a pressure when the user 40 is seated. The major surface 2d has a first region 2e which receives a high pressure from the user 40 and a second region 2f which receives a pressure lower than that of the first region 2e. The first region 2e is a portion corresponding to a portion under a hip of the user 40, for example. The second region 2f is a portion of the major surface 2d other than the first region 2e.

As shown in FIGS. 1 and 2, the holes 22 are arranged in multiple rows in a longitudinal direction and in multiple rows in a lateral direction in the second region 2f of the seat cushion 2. The outlet 13c is provided in the first region 2e. The other ends 22b of the holes 22 are coupled to an intake duct 23. The intake duct 23 covers the lower surface of the pad 2b and communicates with each hole 22. The intake duct 23 is provided with a blower 21. The blower 21 has a fan which is rotated by a motor. Together with the air conditioning device 10 or separately from the air conditioning device 10, the motor is controlled by a controller (not shown).

As shown in FIG. 2, the blower 21 sucks air from the intake duct 23 and discharges the air to the second duct 20. Two second outlets 25 are provided at a leading end of the second duct 20. When the fan of the blower 21 rotates, the air is sucked from the inlets 22a through the seat cover 2c. The air is sucked to the blower 21 through the holes 22 and the intake duct 23. The blower 21 discharges the air to the second outlets 25 via the second duct 20.

As shown in FIG. 1, the second outlets 25 are located at the lower region of the front portion of the seat cushion 2. Specifically, the second outlets 25 are respectively provided in the front shield 7 and located at both left and right sides of the front portion of the seat cushion 2. The second outlets 25 are opened forward and, preferably, opened toward the back side of the left and right calf of the user 40.

When air is discharged from the air conditioning device 10, the air is blown out toward the user 40 from the first outlets 16 on the side portion of the seat cushion 2, as shown in FIG. 1 (primary air stream A). As the fan of the blower 21 rotates, the air in the primary air stream A is sucked from the holes 22 (secondary air stream B). Therefore, the air blown out from the first outlets 16 can flow toward the user 40 by the secondary air stream B without being spread. In this way, the cold or warm air from the air conditioning device 10 can effectively cool or warm the user 40.

As shown in FIG. 2, the holes 22 are oriented toward the user 40. Therefore, the air in contact with the user 40 is sucked from the holes 22. In this way, during cooling, heat is removed from the user 40 through air, and hence, the user 40 can be cooled. The air discharged from the blower 21 is blown out from the second outlets 25 via the second duct 20 (tertiary air stream C). The second outlets 25 are oriented toward legs of the user 40. Therefore, when warm air is blown from the second outlets 25, the calf of the user can be warmed by receiving heat from the warm air. When cold air is blown, the calf is cooled by heat being removed by the cold air. Furthermore, the calf can lose its heat by wind.

As shown in FIGS. 1 and 2, a hole 31 penetrating in a thickness direction is formed in the pad 3b of the seat back 3. The hole 31 has an inlet 31a facing the seat cover 3c. A plurality of holes 31 are provided in a major surface 3d of the seat back 3. The major surface 3d is a region facing the user 40 when the user 40 is seated on the vehicle seat 1. Specifically, the major surface 3d is a region pother than the left and right regions on the front surface of the seat back 3. The left and right regions are bulged forward from the major surface 3d. The major surface 3d receives a pressure when the user 40 is seated.

As shown in FIGS. 1 and 2, the holes 31 are arranged in multiple rows in a vertical direction and in multiple rows in a lateral direction in the major surface 3d of the seat back 3. The other ends 31b of the holes 31 are coupled to an intake duct 32. The intake duct 32 covers the rear surface of the pad 3b and communicates with each hole 31. The intake duct 32 is provided with a blower 30 shown in FIG. 3. The blower 30 has a fan which is rotated by a motor. Together with the air conditioning device 10 or separately from the air conditioning device 10, the motor is controlled by a controller (not shown).

The blower 30 shown in FIG. 3 sucks air from the intake duct 32 shown in FIG. 2 and discharges the air to the second duct 33. Two second outlets 34 are provided in a leading end of the second duct 33. When the fan of the blower 30 rotates, the air is sucked from the inlets 31a through the seat cover 3c. The air is sucked to the blower 30 through the holes 31 and the intake duct 32. The blower 30 discharges the air from the second outlets 34 via the second duct 33.

As shown in FIGS. 1 and 3, the second outlets 34 are located at the left and right on the upper side of the seat back 3. The upper portion of the seat back 3 faces upward, and left and right headrest brackets 3f are provided at the central region of the upper portion. Struts of a headrest (not shown) are inserted into the headrest brackets 3f to support the headrest relative to the seat back 3. The left and right second outlets 34 are located at the outside of the left and right headrest brackets 3f, respectively. The second outlets 34 are opened to the front and toward the width center of the seat 1, as shown in FIGS. 1 and 3. Preferably, the second outlets are opened toward a neck of the user 40 from above shoulders of the user 40 seated on the seat 1.

When air is discharged from the air conditioning device 10, the air is blown out toward the user 40 from the first outlets 18 on the side portion of the seat back 3, as shown in FIG. 1 (primary air stream A). As the fan of the blower 30 rotates, the air in the primary air stream A is sucked from the holes 31 (secondary air stream B). Therefore, the air blown out from the first outlets 18 can flow toward the user 40 by the secondary air stream B without being spread. In this way, the cold or warm air from the air conditioning device 10 can effectively cool or warm the user 40.

As shown in FIG. 2, the holes 31 are oriented toward the user 40. Therefore, the air in contact with the user 40 is sucked from the holes 31. In this way, during cooling, heat is removed from the user 40 through air, and hence, the user 40 can be cooled. As shown in FIGS. 1 and 3, the air discharged from the blower 30 is blown out from the second outlets 34 via the second duct 33 (tertiary air stream C). The second outlets 34 are oriented toward the neck of the user. Therefore, when warm air is blown from the second outlets 34, the neck of the user can be warmed by receiving heat from the warm air. When cold air is blown, the neck is cooled by heat being removed by the cold air. Furthermore, the neck can also lose its heat by wind. Here, the neck tends to feel the temperature, as compared with other regions of the body. Accordingly, the user can feel to be cooled or warmed with relatively little energy.

As shown in FIG. 1, the vehicle seat 1 described above includes a seat main body (the seat cushion 2 and the seat back 3) having the major surfaces 2d, 3d facing the user 40 seated. As shown in FIGS. 2 and 3, the vehicle seat further includes the first air passage, the outlets 16, 18 and the second air passage. The first air passage (the guide duct 11) extends from the air conditioning device 10 of a vehicle toward the seat main body so as to guide air from the air conditioning device 10 to the seat main body. As shown in FIG. 3, the outlets 16, 18 are provided to the side portion of the seat main body and opened so that the air from the first air passage is blown out along the side portion of the seat main body. The second air passage (the holes 22, 31 and the intake ducts 23, 32) has the inlets 22a, 31a opened toward the major surfaces 2d, 3d such that the air blown out from the outlets 16, 18 is sucked from the major surfaces 2d, 3d. The air in the second air passage is sucked by the blowers 21, 30.

Therefore, as shown in FIGS. 1 and 2, the air cooled or warmed in the air conditioning device 10 is blown out from the outlets 16, 18 via the first air passage. The outlets 16, 18 are configured to blow out the air along the side portion of the seat main body. Since the air flows along the side portion of the seat main body, there occurs a Coanda effect that air flows along a wall. Thus, the air flows along the side portion of the seat main body and also flows toward the major surfaces 2d, 3d. The air blown out from the outlets 16, 18 can be sucked from the inlets 22a, 31a opened on the major surfaces 2d, 3d. Thus, the air blown out can be blown in such a way that the air is directed toward the user 40 or goes round the user 40. In this way, the user 40 is enveloped by the cold air or warm air. This state is similar to a state where the user 40 is covered by an air curtain. Thus, the user 40 is primarily effectively cooled or warmed by the cold air or warm air from the air conditioning device 10 (primary cooling or primary warming).

Furthermore, the air is sucked from the inlets 22a, 31a opened on the major surfaces 2d, 3d facing the user 40. Therefore, the air present in a narrow gap between the user 40 and the major surfaces 2d, 3d is sucked from the inlets 22a, 31a. In this way, it is possible to take heat from the user 40 through the air. Thus, during cooling, the user 40 can be cooled by using the air sucked from the major surfaces 2d, 3d (secondary cooling).

As shown in FIGS. 1 and 3, the seat main body has the seat cushion 2 configured to support a hip of the user 40 and the seat back 3 provided to a rear portion of the seat cushion 2 and configured to support a back of the user 40. The second outlets 25 are provided in the seat cushion 2 such that the air discharged from the blower 21 is blown out to the front of the seat cushion 2. Generally, a calf of a user is located in front of the seat cushion 2. Therefore, the calf of the user can be tertiarily cooled or secondarily warmed by the cold air or warm air blown out from the second outlets 25.

As shown in FIGS. 1 and 3, the second outlets 34 opened forward are provided in the upper portion of the seat back 3 such that the air discharged from the blower 30 is blown out forward from the upper portion of the seat back 3. Generally, a neck of a user is located in front of the upper portion of the seat back 3. Therefore, the neck of the user 40 can be tertiarily cooled or secondarily warmed by the cold air or warm air blown out from the second outlets 34.

As shown in FIG. 1, the vehicle seat 1 described above includes a seat main body having the major surfaces 2d, 3d and seat outer peripheries 2g, 3g located at the outer peripheries of the major surfaces 2d, 3d. The vehicle seat 1 further includes the first air passage, the first outlets 16, 18, the second air passage and the second outlets 25, 34, as shown in FIGS. 1 to 3. The first outlets 16, 18 are provided in the seat outer peripheries 2g, 3g, so that the air from the first air passage is blown out from the seat outer peripheries 2g, 3g. The second outlets 25, 34 are configured to blow out the air discharged from the blowers 21, 30 toward the user 40.

Therefore, the air cooled or warmed in the air conditioning device 10 is blown out from the first outlets 16, 18 to the seat outer peripheries 2g, 3g via the first air passage. The air blown out from the first outlets 16, 18 can be sucked from the inlets 22a, 31a opened on the major surfaces 2d, 3d. Therefore, the air blown out can be blown to the user 40 without being greatly spread.

As shown in FIGS. 2 and 3, the air, which is sucked from the inlets 22a, 31a and discharged from the blowers 21, 30, is again blown out toward the user. Therefore, the cold air or warm air from the air conditioning device 10 is again utilized for cooling or warming the user (tertiary cooling or secondary warming). Thus, the cold air from the air conditioning device 10 is utilized three times when cooling the user 40. That is, the cold air blown out from the first outlets 16, 18 cools the user 40, the air sucked from the major surfaces 2d, 3d of the seat main body takes heat from the user 40, and the cold air is additionally blown to the user 40. The warm air from the air conditioning device 10 is utilized two times for warming the user 40. That is, the warm air discharged from the first outlets 16, 18 warms the user 40 and the warm air sucked from the major surfaces 2d, 3d of the seat main body is additionally blown to the user 40. Thus, the cold air or warm air from the air conditioning device 10 can be effectively utilized to cool or warm the user 40.

As shown in FIG. 1, the vehicle seat 1 includes the seat main body (the seat cushion 2) having the major surface 2d facing the user 40 seated. The vehicle seat 1 further includes the first air passage, the outlet 13c and the second air passage. The first air passage (the guide duct 11) extends from the air conditioning device 10 of a vehicle toward the seat main body so as to guide air from the air conditioning device 10 to the seat main body. The outlet 13c is communicating with the first air passage and opened toward the first region 2e of the major surface 2d through the seat main body. The second air passage has the inlet 22a which is opened toward the second region 2f through the seat main body so as to suck air from the second region 2f of the major surface 2d. The air in the second air passage is sucked by the blower 21.

Therefore, two lines of air stream occur in the seat main body. One line is an air stream flowing from the air conditioning device 10 to the major surface 2d of the seat main body. Another line is an air stream in which air is sucked to the seat main body from the major surface 2d by the blower 21. In the first region 2e of the major surface 2d, the cold air or warm air from the air conditioning device 10 is directly blown to the user 40. In the second region 2f of the major surface 2d, the air in the surroundings of the user 40 is sucked by the second air passage.

Therefore, during cooling, in the first region 2e, the cold air from the air conditioning device 10 is directly blown to the user 40. Furthermore, the first region 2e itself can be cooled by the cold air. In the second region 2f, the air in the surroundings of the user 40 is sucked. In this way, it is possible to take heat from the user 40 through the air, thereby cooling the user 40. Further, generally, the air conditioning device 10 discharges cold air after a predetermined time has elapsed from the start-up. Therefore, in the first region 2e using the air conditioning device 10, an effect of cooling the user 40 is small immediately after the start-up of the air conditioning device 10. After a predetermined time has elapsed, the user 40 can be effectively cooled by the cold air. On the other hand, in the second region 2f where the air is sucked, since the air sucked takes heat from the user 40, the user can be cooled immediately. Thus, the user 40 can be cooled immediately by the second region 2f and can be also cooled by the cold air from the first region 2e after a predetermined time has elapsed.

During warming, in the first region 2e, the warm air from the air conditioning device 10 is directly blown to the user 40. Furthermore, the first region 2e itself can be warmed by the warm air. The air in the surroundings of the user 40 is sucked in the second region 2f. Therefore, heat is removed from the user 40 through the air. In this way, a temperature difference between the first region 2e and the second region 2f, which is felt by the user 40, is increased. Generally, when there is a temperature difference, the warmth in the first region 2e can be more strongly felt. Therefore, it is possible to allow the user 40 to strongly feel the warmth.

When the user 10 is seated on the seat main body, the pressure which the first region 2e receives from the user 10 is higher than a pressure which the second region 2f receives from the user 10. Generally, in a higher pressure region, more energy is necessary when the air is sucked than when the air is blown out. Therefore, the air is blown out from the first region 2e which receives a relatively high pressure, and the air is sucked in the second region 2f which receives a lower pressure. In this way, the air can be blown out from and sucked in the major surface 2d with relatively small energy.

The seat main body has the seat cushion 2 configured to support a hip of the user 40 and the seat back 3 provided to a rear portion of the seat cushion 2 and configured to support a back of the user 40. The first region 2e is located at the rear portion of the seat cushion 2 and under the hip of the user 40. Generally, the first region 2e under the hip receives a relatively high pressure. Further, in the region receiving a higher pressure, more energy is necessary when the air is sucked than when the air is blown out. Therefore, the air is blown out from the first region 2e which receives a relatively high pressure, and the air is sucked in the second region 2f which receives a lower pressure. In this way, the air can be blown out from and sucked in the major surface 2d with relatively small energy.

Although the embodiment of the present disclosure has been described with reference to the above-described structure, it is apparent to those skilled in the art that many substitutions, improvements and modifications can be made without departing from the object of the present disclosure. Therefore, the embodiment of the present disclosure can include all of the substitutions, improvements and modifications which do not depart from the spirit and object of appended claims. For example, the embodiment of the present disclosure is not limited to the above-described structure but can be modified as follows.

As described above, an air flowing structure for generating the primary air stream A, the secondary air stream B and the tertiary air stream C is provided to each of the seat cushion 2 and the seat back 3. Instead of this, an air flowing structure may be provided to only one of the seat cushion 2 and the seat back 3.

The second air passage has the holes 22, 31 of the pads 2b, 3b and the intake ducts 23, 32, as shown in FIG. 2. The second air passage may have a pipe penetrating the pads 2b, 3b, instead of the holes 22, 31. The second air passage may have a groove which is formed in the pads 2b, 3b for communicating respective holes 22, 31, instead of the intake ducts 23, 32.

As shown in FIGS. 1 and 3, the second outlets 25 are provided in the front portion of the seat cushion 2 and opened forward such that the air discharged from the blower 21 is blown out toward the calf of the user 40. Instead of or in addition to this, the second outlets may be provided in the seat cushion 2 such that the air is blown out toward the other portions of the user. For example, the second outlets may be provided to the side portion of the seat cushion 2 and have an opening opened upward such that the air is blown out toward the arms of the user. In order to blow out the air toward the back of the knee of the user, the second outlets may be provided to the side portion or the front portion of the seat cushion 2 and have an opening opened upward.

As shown in FIGS. 1 and 3, the second outlets 34 are provided in the left and right on the upper side of the seat back 3 and opened to the front and toward the width center such that the air discharged from the blower 30 is blown out toward the neck of the user 40. Instead of or in addition to this, the second outlets may be provided in the seat back 3 such that the air is blown out toward the other portions of the user. For example, the second outlets may be provided in the rear portion of the seat back 3 and have an opening opened forward such that the air is blown out toward the arms of the user.

As shown in FIGS. 1 and 3, the second outlets 25, 34 are configured to blow out the air discharged from the blowers 21, 30 toward the user 40 seated on the seat 1. Instead of or in addition to this, the seat 1 may be provided with the second outlets for blowing out the air toward the seat 1 or a rear user seated on a rear seat located on the rear of the seat main body. For example, the second outlets may be provided in the rear portion of the seat cushion 2 and have an opening opened rearward. The second outlets may be provided in the lower portion of the seat back 3 and have an opening opened rearward.

As shown in FIGS. 1 and 3, the first outlets 16, 18 for primarily blowing out the air supplied from the air conditioning device 10 are provided to the side portion of the seat cushion 2 or the seat back 3. Instead of or in addition to this, the first outlets may be provided to the other portions of the seat outer peripheries 2g, 3g of the seat cushion 2 or the seat back 3. For example, the first outlets may be provided to the front portion of the seat cushion 2 to blow out the air upward along the front portion. The first outlets may be provided in the upper portion of the seat back 3, for example, at the same position as or in proximity to the second outlets 34 to blow out the air forward along the upper portion.

A heater having a heating wire may be provided in the seat cushion 2 and/or the seat back 3. The heater can be provided between the pads 2b, 3b and the seat covers 2c, 3c. Generally in order to discharge the warm air, the air conditioning device 10 requires a predetermined time from the start-up. By using the heater during the predetermined time, the seat cushion 2 or the seat back 3 can be relatively quickly warmed. When the warm air is discharged from the air conditioning device 10, the heater may be utilized. In this case, the air sucked from the holes 22, 31 is warmed by the heater. Therefore, the air temperature of the tertiary air stream C, which is sucked from the holes 22, 31 and discharged from the second outlets 25, 34, is increased. Thus, the user can be reliably warmed by the tertiary air stream C.

As described above, the seat cushion 2 is provided with the outlet 13c opened toward the first region 2e of the major surface 2d. The first region 2e is located under the hip of the user 40. Instead of or in addition to this, the seat cushion may be provided with an outlet opened toward the other regions of the major surface 2d. For example, the outlet may be provided in a region (first region) of the major surface 2d, which is located under the calf of the user 40. In this way, the cold air or warm air from the air conditioning device 10 can be directly blown to the calf of the user 40. Here, the region located under the calf is a region which receives, from the user 40, a pressure higher than that of the other regions of the major surface 2d.

The seat cushion 2 is provided with the outlet 13c opened toward the first region 2e of the major surface 3d. Instead of or in addition to this, the seat back 3 may be provided with an outlet opened toward the major surface 3d. For example, the seat back may be provided with the outlet opened toward a region corresponding to a waist of a user. In this way, the cold air or warm air from the air conditioning device 10 can be directly blown to the waist of the user 40. Here, the region corresponding to the waist is a region which is receives, from the user 40, a pressure higher than that of the other regions of the major surface 3d.

What is claimed is:

1. A vehicle seat comprising:
   a seat main body having a seat cushion and a seat back, wherein each of the seat cushion and the seat back has outer peripheral surfaces and a major surface provided between the outer peripheral surfaces, and the major surface extends in a lateral direction of the vehicle seat and faces a user to be seated;
   a first air passage extending from an air conditioning device of a vehicle toward at least one of the seat cushion and the seat back so as to guide air from the air conditioning device to the at least one of the seat cushion and the seat back;
   an outlet communicating with the first air passage, the outlet being provided at and opened toward a first region of the major surface through the at least one of the seat cushion and the seat back;
   a second air passage having an inlet which is provided at and opened toward a second region of the major surface through the at least one of the seat cushion and the seat back so as to suction air from the second region; and
   a blower configured to suction air in the second air passage, wherein
   the first region and the second region are located at a center of the major surface of at least one of the seat cushion and the seat back in the lateral direction of the vehicle seat,
   the second region extends beyond the first region in the lateral direction of the vehicle seat toward the outer peripheral surfaces of the at least one of the seat cushion and the seat back, and
   when the user is seated on the seat main body, the first region and the second region receive a seated pressure from the user.

2. The vehicle seat according to claim 1, wherein
   the seat cushion is configured to support a hip of the user to be seated and the seat back is provided to a rear portion of the seat cushion and configured to support a back of the user to be seated, and
   the first region is located at the rear portion of the seat cushion and under the hip of the user when the user is seated.

3. The vehicle seat according to claim 1, wherein
   the seat cushion is configured to support a hip of the user to be seated and the seat back is provided to a rear portion of the seat cushion and configured to support a back of the user to be seated, and the first region is located at a rear central region of the rear portion of the seat cushion.

\* \* \* \* \*